US008949272B2

(12) United States Patent
Hutschemaekers (10) Patent No.: US 8,949,272 B2
(45) Date of Patent: Feb. 3, 2015

(54) METHOD OF PROVIDING A CAR POOLING ASSISTANCE THROUGH A WIRELESS COMMUNICATION SYSTEM

(75) Inventor: Mathias Hubertus Maria Hutschemaekers, Poederoijen (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 708 days.

(21) Appl. No.: 12/996,485

(22) PCT Filed: Jun. 5, 2008

(86) PCT No.: PCT/NL2008/050351
§ 371 (c)(1),
(2), (4) Date: Dec. 6, 2010

(87) PCT Pub. No.: WO2009/148298
PCT Pub. Date: Dec. 10, 2009

(65) Prior Publication Data
US 2011/0125794 A1 May 26, 2011

(51) Int. Cl.
*G08G 1/123* (2006.01)
*G01C 21/34* (2006.01)
*G06Q 50/30* (2012.01)
(Continued)

(52) U.S. Cl.
CPC ............ *G08G 1/202* (2013.01); *G01C 21/3438* (2013.01); *G06Q 50/30* (2013.01); *G06Q 10/06311* (2013.01)
USPC .......................................... 707/780; 701/533

(58) Field of Classification Search
CPC .................... G01C 21/3438; G06Q 10/06311; G06Q 50/30

USPC ............................................ 707/780; 701/533
See application file for complete search history.

(56) References Cited

U.S. PATENT DOCUMENTS 8,140,256 B1 * 3/2012 dos-Santos et al. ........... 701/400
2003/0195701 A1 * 10/2003 Ohler ............................ 701/209
(Continued)

OTHER PUBLICATIONS

Shalaik, Bashir, Ricky Jacob, and Adam C. Winstanley. "Integrating Real-time Bus-Tracking with Pedestrian Navigation in a Journey Planning System." Proceedings of the GIS Research UK 18th Annual Conference (London, England, 2010), M. Haklay, J. Morely, and H. Rahemtulla, Eds., University College London. 2010.*
(Continued)

*Primary Examiner* — William Spieler
(74) *Attorney, Agent, or Firm* — Nixon & Vanderhye, P.C.

(57) ABSTRACT

The invention relates to a method which receives location information of a mobile terminal of a single user. One or more journeys are extracted from the location information of the single user. The corresponding journey data is stored in a journey database. From the journey data in the journey database, journey patterns for the single user are extracted. A journey pattern indicates at least the regularity of a particular journey in time, i.e. over a number of days. The journey patterns are stored in the pattern database. The journey patterns of the single user are matched with patterns of other users. If a match is found, at least one match based on the journey patterns is sent to the single user. These features enable the carpool service to find a match which takes into account the regularity across a period of days. By identifying the regularity, a better match can be made with users which travel the same route, as also the days on which the users travel are taken into account.

18 Claims, 6 Drawing Sheets

(51) Int. Cl.
*G06Q 10/06* (2012.01)
*G08G 1/00* (2006.01)

(56) References Cited

U.S. PATENT DOCUMENTS

| | | | |
|---|---|---|---|
| 2004/0158483 A1* | 8/2004 | Lecouturier | 705/6 |
| 2005/0049781 A1 | 3/2005 | Oesterling | |
| 2005/0125148 A1* | 6/2005 | Van Buer et al. | 701/209 |
| 2006/0270421 A1* | 11/2006 | Phillips et al. | 455/457 |
| 2007/0294030 A1* | 12/2007 | Jones | 701/209 |
| 2008/0125959 A1* | 5/2008 | Doherty et al. | 701/200 |
| 2009/0125340 A1* | 5/2009 | Gosney | 705/5 |

OTHER PUBLICATIONS

Massaro, Dominic W., et al. "Carpoolnow-Just-in-Time Carpooling without Elaborate Preplanning." WEBIST. 2009.*
Intermec, How the CN50 Optimizes Vehicle and Pedestrian Navigation with GPS and Digital Compass, 2009.*
International Search Report for PCT/NL2008/050351, mailed Feb. 13, 2009.
International Preliminary Report on Patentability for PCT/NL2008/050351, mailed Aug. 23, 2010.

* cited by examiner

Journey occurrences
Start date/time
End date/time

Start points

End points

Fig 4

Pattern table
For user x

| Name | Start point | End point | Pattern type | Conformity | Start time | Start time deviation | End time | End time deviation |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

*Fig 7*

METHOD OF PROVIDING A CAR POOLING ASSISTANCE THROUGH A WIRELESS COMMUNICATION SYSTEM

This application is the U.S. national phase of International Application No. PCT/NL2008/050351 filed 5 Jun. 2008 which designated the U.S., the entire contents of which is hereby incorporated by reference.

TECHNICAL FIELD

The invention relates to a method of providing a car pooling assistance through a wireless communication system, a service control entity adapted to perform the method, a computer program loadable into a processing unit of a service control entity, the computer program comprising portions of software code adapted to perform the method, and a computer-readable medium product comprising such a computer program.

BACKGROUND

Wireless communication services for mobile vehicles, such as navigation and roadside assistance, have increased rapidly in recent years. Global Positioning System (GPS) satellite technology has played an important part in these services. With the aid of GPS technology, the position of a vehicle or mobile device may be determined at any time.

A substantial portion of any driver's time is spent on frequently traveled routes, such as the ones used by drivers daily commuting to work or school. Often the route to work or school is traveled using roads with heavy traffic. The periods of heavy traffic usually coincide with a person's daily commute. In many communities there has been a concerted effort to reduce the number of vehicles on the road during peak travel times. These efforts largely consist of encouraging commuters to carpool. What is lacking in many of these efforts is an organized efficient system of bringing together potential carpoolers leading to almost no reduction of the number of vehicles on the road.

A better system for linking carpoolers together would alleviate some of the congestion that occurs during normal commuting hours. More importantly, reducing the number of vehicles on the road leads to a reduction of exhaust pollutants that are harmful to the environment.

US2005/0049781A1 discloses a method and system for providing a carpool service. The method includes steps for receiving a user carpool enrolment request, obtaining the positional information of the user's moving vehicle, storing the positional information as a route in a service centre database and sending at least one available match based on the carpool enrolment request and the routes in the service centre database to the user. The software searches for other subscribers in the database that travel the same or nearly the same route.

A problem with the solution in the above identified patent application is that the matching is based on the route of single journey and the corresponding departure and arrival time. However, a match on said features will not result into a car pool agreement between two users if they will not travel on the same days.

SUMMARY

It is an object of this invention to provide an improved method of providing a carpool service using a wireless communication system.

According to an aspect of the invention there is provided a method which receives location information of a mobile terminal of a single user. One or more journeys are extracted from the location information of the single user. The corresponding journey data is stored in a journey database. From the journey data in the journey database, journey patterns for the single user are extracted. A journey pattern indicates at least the regularity of a particular journey in time, i.e. over a number of days. The journey patterns are stored in the pattern database. The journey patterns of the single user are matched with patterns of other users. If a match is found, at least one match based on the journey patterns is sent to the single user. These features enable the carpool service to find a match which takes into account the regularity across a period of days. By identifying the regularity, a better match can be made with users which travel the same route, as also the days on which the users travel are taken into account.

According to an embodiment, the extracting journey patterns action identifies journeys having the same start and end location, with similar start and end times from the journey data to obtain a group of similar journeys. Subsequently, one or more pattern types are determined from the group of similar journeys and the start and end location with a determined pattern type are provided as a journey pattern. This feature enables to improve the matching result.

According to an embodiment, the pattern type is one selected from a group of repetition patterns, the group of repetition patterns comprises at least two repetition patterns selected from a group comprising: every day, every working day, every day except one, every week same day, every week different days, every two weeks, every month. Using repetition patterns enables the service to find easily users having a similar travel behavior across days.

According to an embodiment, the extracting journey patterns action further calculates a conformity indicating the consistency of the group of similar journeys corresponding to the pattern type. The conformity is linked to a journey pattern. The conformity enables us to indicate deviations with respect to a particular pattern type. This allows us to assign a pattern type to a regular traveled route even if the route is not traveled on all corresponding days. The conformity is used as a measure to determine a successful match.

According to an embodiment, the extracting journey patterns action further calculates an estimated start and end time from the start and end times of the group of similar journeys associated with a journey pattern and links the estimated start and end time to a journey pattern. According to yet a further embodiment, the extracting journey patterns action further calculates start and end time deviations from the start and end times of the group of similar journeys associated with a journey pattern and links the start and end time deviations to a journey pattern. Adding start and end time and corresponding deviations helps to find a better match between different users.

According to an embodiment, the extracting journey patterns action searches in the journey patterns for a return journey that matches a journey pattern and links the journey pattern and the matched return journey pattern. The linking of a journey pattern and a return journey pattern provides a means for easily searching users that according to the same journey pattern travel a route and return route on the same days. This has the advantage that the match has taken into account that the users can travel both routes together, which is advantageous over traveling to school with a carpooler and back with another carpooler.

According to an embodiment, the method further receives user preferences for matching, wherein the user preferences form a basis to find a match between the journey patterns of the single user and other users. By taking into account user preferences related to particular wishes, a better match with other users can be made.

According to an embodiment, the matching action uses pattern rules to determine a match between journey patterns of different users, wherein the pattern rules define which combination of pattern types match. The pattern rules enable to find efficiently pattern types which are a subset of a particular pattern type. This enables to find a match with users that travels less or more frequently along the same route.

According to an embodiment, the matching action determines for two journey patterns which pattern type match a first additional time corresponding to the traveling time between the start locations of the two journey patterns and the traveling time between the end locations of the two journey patterns a second additional time. A match is detected if the first and second additional time does not exceed a predefined criterion.

According to an embodiment, the start or end time matches if the time ranges of the two journeys have a correlation of a predefined percentage.

According to yet another embodiment, the service, after at least one match action, sends a message to the single user, indicative of the match or matches found. The service receives the selection of the user and sets up a call, anonymously, between the user and the person of the matching pattern.

Another aspect of the invention provides a service control entity adapted to perform the method according the invention.

Another aspect of the invention provides a computer program loadable into a processing unit of a service control entity, the computer program comprising portions of software code adapted to perform the method according to the invention.

According to an aspect of the invention there is provided a computer-readable medium product comprising such a computer program.

The above aspects provide an improved way of implementing a carpool service.

BRIEF DESCRIPTION OF THE DRAWINGS

Embodiments will now be described, by way of example only, with reference to the accompanying schematic drawings in which corresponding reference symbols indicate corresponding parts, and in which:

FIG. 1 schematically shows a communication system arranged to provide a car pooling assistance, FIG. 2 schematically shows a block diagram of an embodiment of an service control entity, FIG. 3 schematically show the content of a journey database, FIG. 4 schematically shows an embodiment of a data structure of a pattern table, FIG. 5 schematically shows a flow diagram according to an embodiment, FIG. 6 schematically shows a flow diagram according to an embodiment, and FIG. 7 schematically shows a flow diagram according to an embodiment.

DETAILED DESCRIPTION

Figure 1:
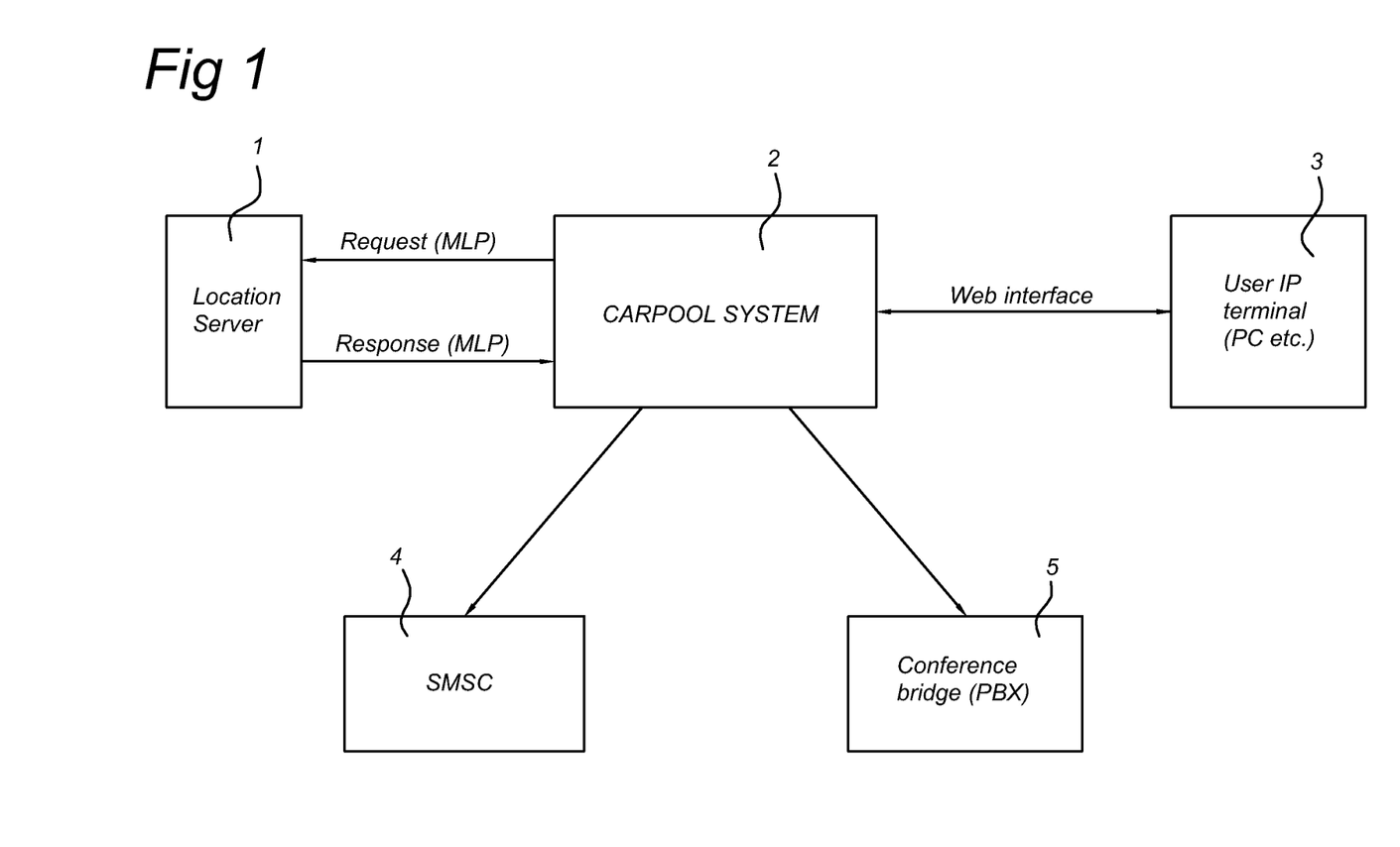

FIG. 1 schematically shows an embodiment of a communication system for providing a car pooling assistance using a wireless communication system, in accordance with the present invention.

The communication system comprises a service control entity 2 (SCE) having a processing unit on which a carpool system application is running. The carpool system application is a computer program is loaded into the processing unit to perform at least partially the method providing the car pooling assistance according to the invention. A location server 1 is provided to communicate with the service control entity 2. The location server 1 provides on request by a user location information of the location of a user terminal, such as a mobile phone or any other suitable mobile communication device (not shown). For the communication between the service control entity 2 and the location server 1 a Mobile Location Protocol could be used.

Furthermore, the communication system may also include one or more terminals 3 such as clients, personal or user computers. The terminals 3 include a computer readable medium that executes Internet browser and Internet-access computer programs to send and receive data over a communication network to the service control entity 2. By means of the Internet browser or carpool assistance application running on the terminal 3, a user can provide his personal information such as preferences to the carpool system application.

The system may further include a short message service centre 4 (SMSC) to deliver an SMS to a mobile phone. The service control entity 2 is arranged to communicate with the SMSC to instruct the SMSC 4 to send an SMS to a user's mobile phone. The system may further include a conference bridge or Private branch exchange (PBX) to set up a call between mobile phones or internet applications to connect the users.

The concept of the invention is an extension to the location information collecting and analysis service that results in the offering of car pooling opportunities to the user as described in US2005/0049781A1. The complete service looks as follows. The service is offered by a service provider who could be a mobile communication operator. A user can subscribe to the service via the user terminal 3 by providing his personal information and carpooling preferences. In an embodiment the service attaches a unique identifier to the registered user details. In all communications to other parties the unique identifier is used to protect the privacy of the user. When a user subscribes to the service, which is running on the service control entity 2, location information of the location of his terminal is collected with a certain time interval (between 1 and 30 minutes) by means of the location server 1. A terminal can be any mobile communication device. The location information is either extracted from the mobile network or provided by a GPS device connected to the terminal. The length of the interval and the accuracy of the location information should make it possible to see the start and the end of the journey in location and in time. The service extracts journey information from this location information. After a minimum observation period, the service analyses the journeys to extract one or more patterns of journeys. These patterns are matched with those of other users whose pattern exist at the same service provider in accordance with the preferences given by a user. It is also possible that patterns are matched, anonymously, with patterns existing at other service providers. If matches are discovered, both users are informed. The users could be informed by means of SMS messages, E-mail or any other suitable electronic messaging system. If multiple matches occur, the user can select which of them suites him best. The selection may be via the user terminal, SMS or any other suitable way to identify the users selection to the service. If a user has selected the best match, the service sets up a call to that user without disclosing the identities of either of the users. A user has the possibility to change matching preferences at any time, which may lead to different matching results.

Summarizing, the invention covers the following points:
1. When journey information about all the journeys of a single user has been extracted from the collected location information, an algorithm is applied to extract journey patterns. A pattern is defined by a journey with a distribution of start and end times, the frequency and the rule.
2. Storing the journey patterns per user in a journey database, one per operator
3. Matching pattern data from one subscriber to pattern data already in the pattern data base
4. Creating interfaces to the journey/pattern databases so that operators can access other operator's journey/pattern databases and matching pattern data from one subscriber to pattern data extracted from other operator's journey/pattern databases.

Figure 2:
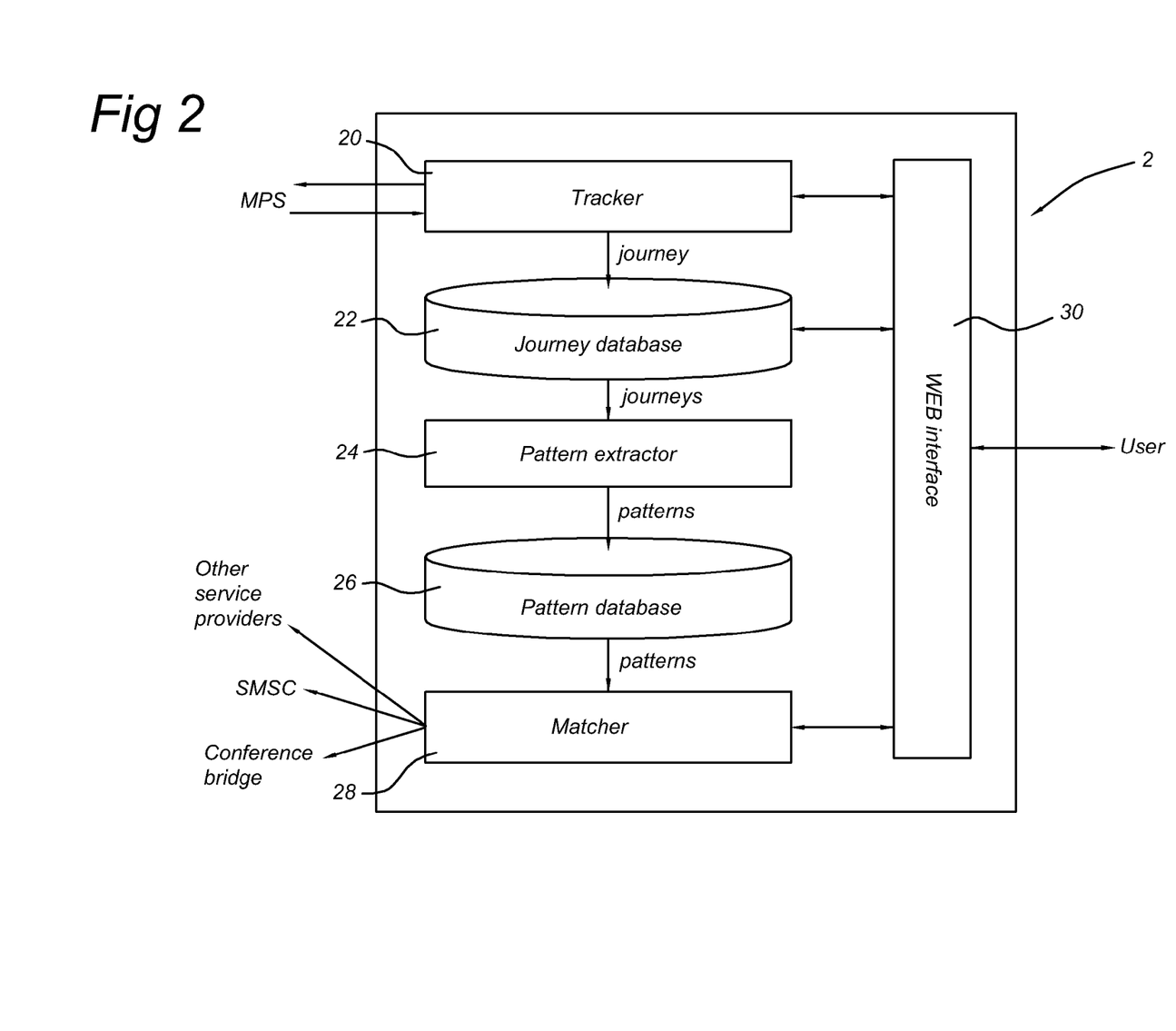

FIG. 2 schematically shows a block diagram of an embodiment of a service control entity 2. The service control entity functionally includes a tracker 20, a journey database 22, a pattern extractor 24, a pattern database 26, a matcher 28 and a WEB interface 30. The WEB interface 30 provides a communication means with the user and communicates with the tracker 20, journey database 22 and matcher 28. The tracker 20 sends requests to a mobile positioning system (MPS) to obtain a response comprising the actual position of a mobile terminal. The protocol used for the communication may be the mobile location protocol MLP. The tracker 20 retrieves from the acquired positions of the mobile terminal journeys. This will be described in more detail below. The journeys are stored in a journey database 22. A pattern extractor 24 detects from the journeys in the journey database 22 journey patters, which are stored in a pattern database 26. The user provides his personal preferences, to be used as input to the matching process, to the matcher by means of the WEB interface 30. The matcher 28 executes a matching algorithm to find one or more matches between the journey patterns of the user and the journey patterns of other users. The matches may be communicated to the user by means of the WEB interface 30 or an SMS message. Furthermore, the matcher initiates the setup of a call between users and provides the possibility to provide communication with journey databases and/or pattern databases from other service providers. An interface with the journey databases and/or pattern databases from other service providers enables the car pooling service according to the invention to improve the service by taking into account the data present in the databases from other operators and finding more matches. It should be noted that the functions described above are computer implemented functions which could be executed on one or more processing units. The processing units may be at physically different locations, wherein the processing units are connected to each other by means of a communication network.

An alternative to the journey information collecting way of the application disclosed in US2005/0049781A1, in which the journey information is extracted automatically instead of a user having to indicate that this is a suitable journey will be disclosed.

The method to extract journeys from all location data is as follows. First a distinction is made between traveling and not-traveling time. If two subsequent samples have the same location, a conclusion is that the person is not traveling. If the accuracy of the location source is such that minor movements such as walking distances within a company's site or a walk during the lunch break gives different locations, a separate filtering step may be necessary to filter these smaller movements out.

If it is established what is traveling time and what not, it is necessary to separate the journeys. Journeys are separated by a period of not-traveling. The time used for this period should at least be a quarter of an hour. Thus stopping for a small errand is not considered as two separate journeys: one journey to that point and a second journey from that point. If this period is chosen too long, some destinations will not be recognized as such. The result is that journeys will come up from home to home without stop.

There is a relation between the period between location samples and the period used for establishing journeys. The period between samples should be shorter than half the period used to separate journeys. Shorter sample periods give more accuracy in establishing how long a user is staying at the same location.

Figure 3:
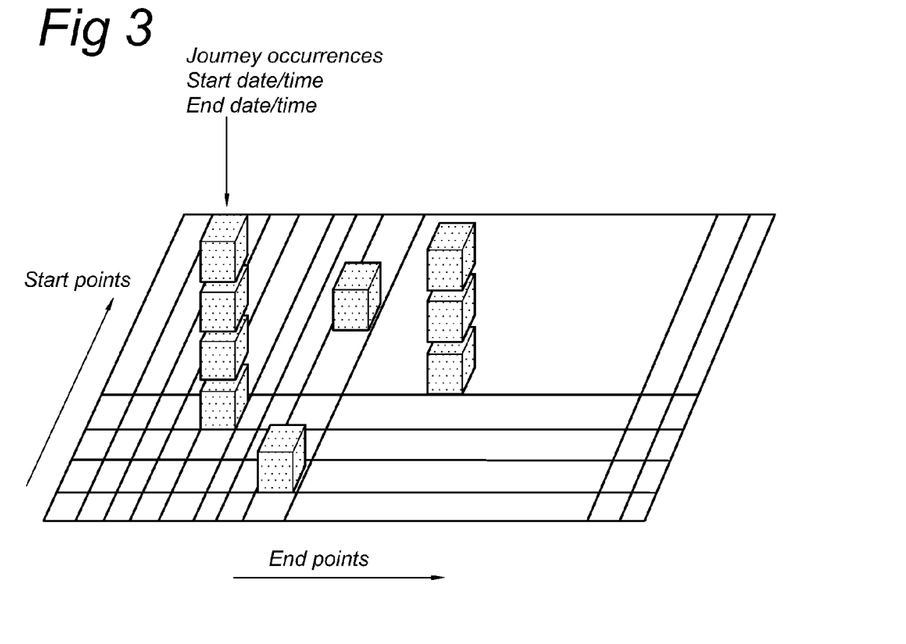

All the journeys are registered with start position, end position, start time and end time. Everything is registered with the accuracy given by the sample rate and the positional accuracy of the location information. The extracted journey data is stored in the journey database 22. FIG. 3 schematically show the content of a journey database. The journey data of a user X is stored in a journey table. By means of the start points and end points, an application can easily find similar journeys and determine the journey occurrences of a particular journey.

The pattern extractor 26 derives from the journeys in the journey database 22 one or more journey patterns. A journey pattern indicates how often a journey with a fixed start and end location, with a distribution of start and end times, occurs and according to which rules they are organized.

The first step is to identify similar journeys, i.e. with the same start and end location, with similar start and end times, (but on different days). A location is regarded similar when the distance between positions is below a predefined threshold. A suitable threshold is for example the maximal length of a parking place or the maximal length of an area in which a users parks his car near his house or work. Similar start and end times mean within certain accuracy. Acceptable accuracy for the matching is a couple of hours. Within each group of similar journeys, the individual journeys are matched against patterns. For patterns only journeys on different days are compared. These are a number of patterns against which the patterns are matched:
Every day
Every working day
Every working day except one
Every week, same day
Every week, different days
Every X weeks
Every month Against which pattern to match depends on how often a journey occurs: if a journey is only registered three times in four months, it is not necessary to match against daily repetition.

For the matching of patterns between users it is good to calculate per pattern the conformance and the distribution of start times. Conformity is how consistent a pattern is, based on the percentage of missing journeys. In a pattern of 'every Thursday', observed during 10 weeks, if one Thursday is missing, that gives a conformance percentage of 90%. The journey distribution of start times would say that the average start time is 8.30, but with an average deviation (of the last x observations) of 10 minutes. Distribution of end times may be considered, too.

Of course there is overlap in the patterns. If the pattern 'All weekdays' is applicable, the pattern 'Weekly, on Monday' is applicable, too. The patterns may have differences in conformity and distribution of start times.

Figure 4:
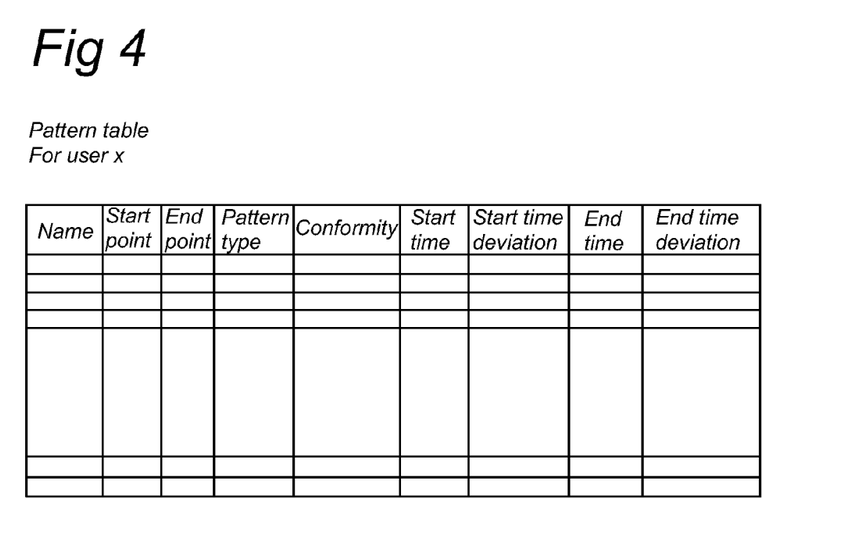

FIG. 4 shows an exemplar embodiment of a pattern table for user X. Each detected pattern in the embodiment comprises a unique name, start point, end point, pattern type, conformity, start time, start time deviation, end time and end time deviation. The unique name could be assigned by the pattern extractor and optionally overwritten by the user. If there is overlap in patterns for a particular journey, for each possible pattern an entry will be made in the pattern table or database.

After determining the journey patterns of a user, they can be matched with journey patterns of other users. For carpooling it is essential that both the journey patterns to a destination and from a destination match. Matching of patterns between users is difficult without user preferences for matching. The user preferences form a basis to find a match between the journey patterns of the single user and other users.

User preferences could indicate:
  Whether it is more preferred to have most matches with one other party or to have most matches overall.
  Whether any of the times (start time to a destination, end time at the destination, start time from the destination, end time at the return destination) is critical. This might be the case in some profession, for example is a user has to start work at 8 o'clock and ends work at 5 o'clock. Basically this should indicate the maximum allowable deviation in time and/or time window in which the end time at the destination may occur.
  Which deviation in location is acceptable. This could probably best be expressed as minutes of additional traveling time allowed. An external routing service could be used to translate the distance between two locations into additional traveling time.
  What the minimum match in pattern is. E.g. "I go to work every working day and I am not interested in matches in pattern that concern less than two days per week.".
  Whether it is acceptable to establish match patterns concerning a journey with one person and match pattern for the return journey with another person.

The assumption is that if a journey and the return journey are on the same day, matching should normally be done on the two journeys.

There are two possible methods of detecting both journeys and return journeys:

1. Include the return journey if applicable, in the pattern, so that there is a second start time and stop time as additional matching criteria. It requires a search within the set of patterns, to establish that similar patterns exist with the start and end position reversed.

2. Apply the matching to single journeys only and do a separate matching step afterwards to a return journey. For that matching step it is necessary to identify the return journey belonging to a journey, in order to be able to compare matching results from the journey with the matching results from the return journey.

In the remainder of the description the first method is assumed.

The result of the pattern extraction is the set of journey patterns of one user which is to be matched against all the available journey patterns of other users in the pattern database.

A match between two user patterns is considered when the patterns are in accordance with predefined criteria.

Below is a list of criteria and when a criterion is considered 'matched'.

1. Pattern Rules

Patterns can only match with patterns of a similar or less frequency. So a pattern with rule 'All working days' can match with 'Weekly, on Thursday', but not the other way around. Because the data base contains for all users that have a pattern ' all working days' also a pattern 'Weekly, on Thursday', matches with patterns with a higher frequency will be found. In an implementation, a list could be provided with the combinations that are considered matching. Pattern rules are used to determine a match between journey patterns of different users with different pattern type. The pattern rules define which combination of pattern types enables to find a match.

2. Start And End Position

The start and end position are considered matching if the additional time in traveling necessary between the start positions of the journeys of two users, increased with the traveling time between the end positions of that same two journeys does not exceed a time, specified in the user's preferences. The traveling times can be obtained from external routing services. If no preference is expressed about the maximum additional time, as a default a percentage of the traveling time is assumed, for example 10%. In stead of additional time in traveling necessary between the start/end positions of the journeys of two users, the additional length of traveling route could be used as parameter for a matching criterion in a similar way. This information can also be obtained from external routing services. A match is considered when the additional length of traveling route or a ratio between additional length of traveling route and total length of combined traveling route does not exceed a predefined value, the value could be a fixed value or based on a user preference.

Furthermore, another criterion for finding matching start and end position could be the ratio between the sum of the distance between start positions and end positions of two users and longest distance between the start position and the end position of one of said two users. If the ratio is below a predefined value, a match is considered to be found. It might be clear, that also a combination of the start and end position matching criteria defined above might be used to determine a match.

3. Start And End Time

A time is considered matching if the time range based on the average time and the standard deviations is overlapping for at least a quite high percentage (e.g. 75%) with the time range in the data base. This applies to both start and end time.

4. Start Time And End Time of the Return Journey.

The matching of the normal start and end time applies.

The complete result of the matching process probably requires some additional filtering according to the expressed preferences of the user. Also a default filtering could be that matching patterns with the highest conformance are preferred. Additionally, a ranking can be performed on the resulting matching patterns.

Figure 5:
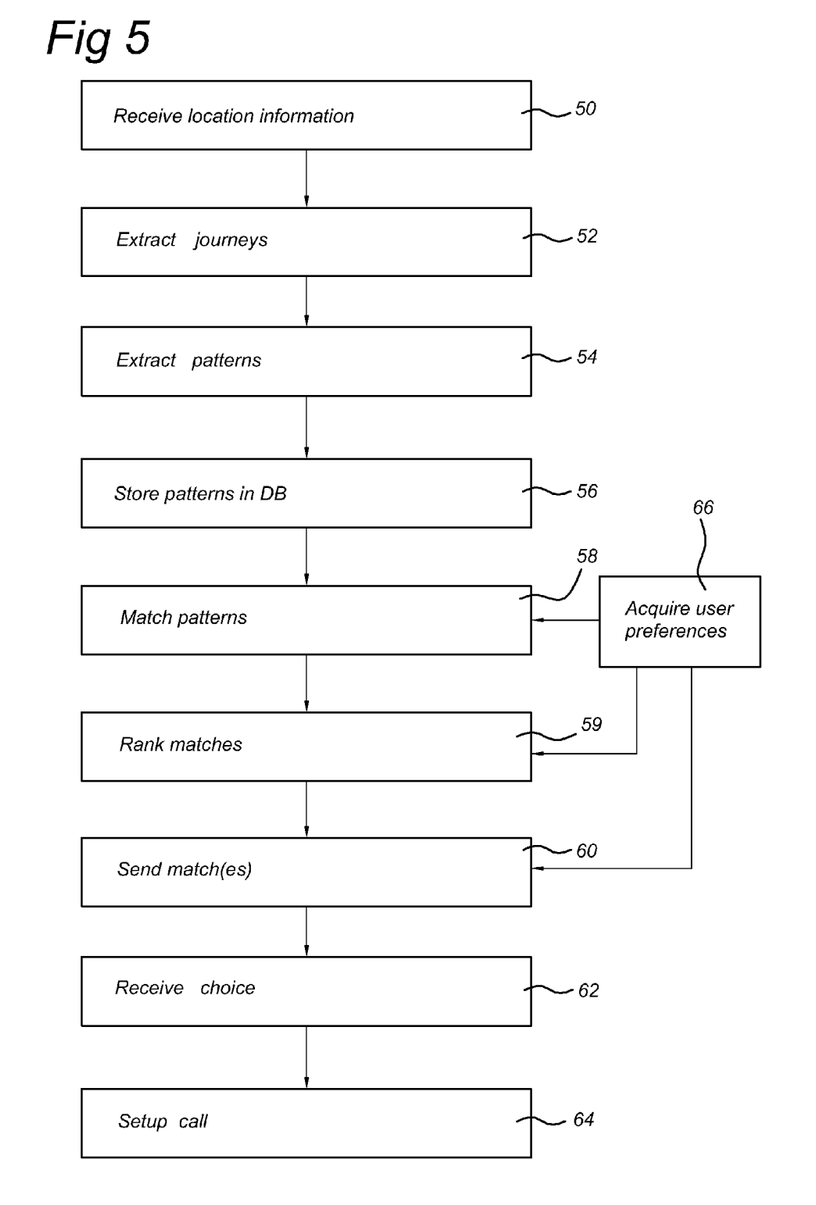

FIG. 5 schematically shows a flow diagram of an embodiment disclosing the actions to be performed to come from location information to a setup call between matched users. After a user has subscribed to the carpool service, the tracker 20 will collect location information corresponding to the location a mobile terminal of the single user. This action is illustrated by box 50 "Receive location information". At regular intervals, the tracker 20 will receive location information of the terminal. This could be on only one request to a location server, which subsequently sends at regular intervals the location or locations during the last interval to the tracker 20. In another embodiment the tracker requests at regular intervals for the location of the terminal. Many other possibilities are possible to receive location information. After receiving the location of the terminal over a predetermined minimal period, the tracker will analyze the location information to extract journeys from the location information. Methods to extract journeys are described above and illustrated by box 52 "extract journeys". The extracted journeys will be stored as journey data in a journey database 22 for further analysis by a patter extraction application 24. The pattern extraction application 54 extracts journey patterns from all journey data of the user and stores the journey patterns in a pattern database. How to derive journey patterns from the journey data is described above. A journey pattern indicates at least the regularity of a particular journey in time. Furthermore, a journey pattern should comprise a start location and an end location. In step 56 the derived journey patterns are stored in a travel pattern database. In action 58 the journey patterns of single user are matched with journey patterns of other users. As matching between users is difficult without user preferences, user preferences are acquired to streamline or direct the matching process.

If more than one match is found, in action 59 "rank matches", the matches could be ranked based on one or more ranking rules. Some examples of ranking rules are, total traveling time, length of route, the ratio between the additional length of route to pick up a carpooler and the length of route traveling together, the ratio between the additional time to pick up a carpooler and the total time traveling together, and any suitable combinations of the given examples.

The one or more matches found in action 58 and optionally ranked in action 59 are sent to the user which is indicated by action 60. In an embodiment, the number of matches sent to a user is limited by an application parameter. The application parameter could be a fixed value or based on one of the user preferences.

The found matches could be sent by SMS message, Email or any other communication service to sent readable data. In the message, the user can see characteristics of the found matches, such as pattern type, conformity, additional traveling time, and any other information to identify the matched journey pattern of the user and similarity with the journey pattern of the other user.

The user should then make a choice and identify whether one of the found matches suites him. In action 62, the tracker 28 receives the response of the user indication which of the found matches suites him best. Upon receiving the choice of the user, the tracker 28 initiates a setup call 64 between the user and the user associated with the choice. To secure privacy of the user, in an embodiment, the phone numbers of the users will not be sent to the phones of the respective users. A PBX or any other suitable means, for example means for setting up a Voice over Internet Protocol (VOIP) conversation or other internet communication applications, could be used to setup a call or a voice connection between users.

In an embodiment the carpooling system (2) is set up in an intelligent network (IN) or IP multimedia system (IMS) as an application. The IN or IMS system will setup a connection between both parties based on the users wish. The user indicates a potential pooling party by means of an identifier given with each match in the ranked match list. This secures that privacy is maintained. In this embodiment the IN or IMS takes care of the call set-up, as either regular voice call, VOIP call, chat session, or the like and there is no need for a conference bridge (5) or the like. Instead of a voice call, the IN or IMS can provide exchange of Email where the address of both parties is only known to the IN/IMS and parties use identifiers to address each other.

Figure 6:
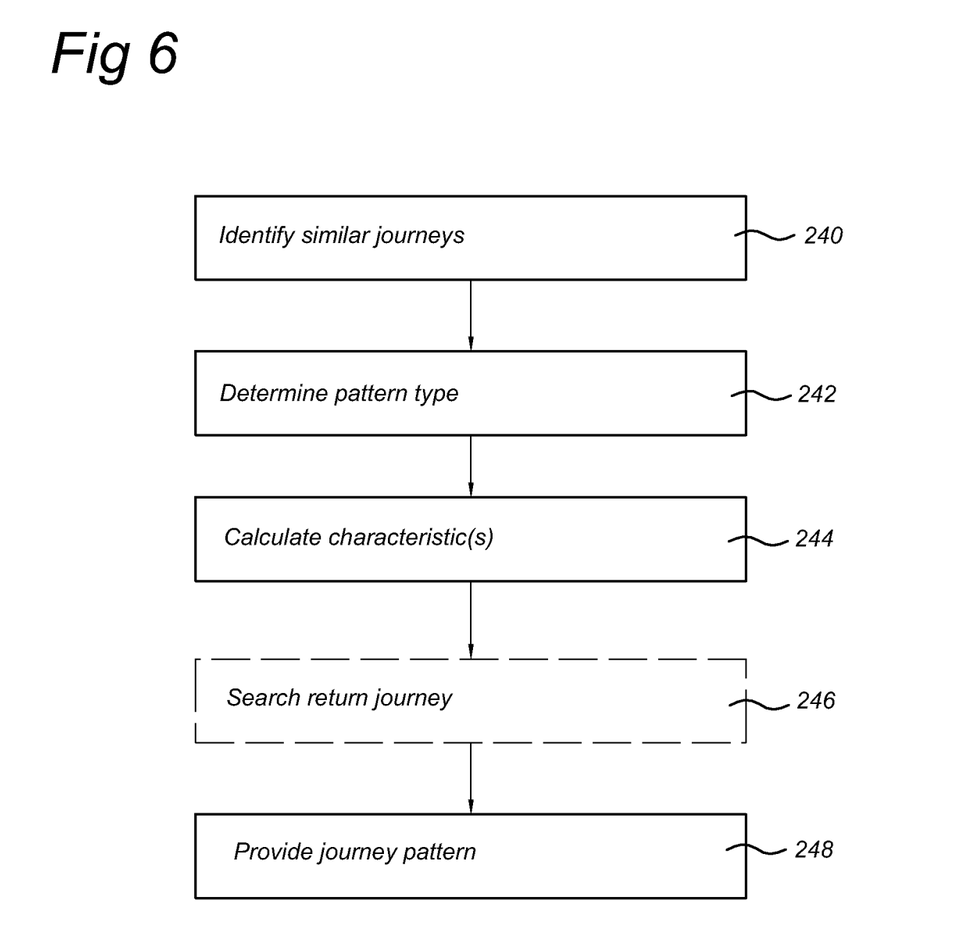

FIG. 6 schematically shows in more detail a flow diagram of action 54 in FIG. 5. The process to extract journey patterns from the journey data of a user starts with action 240 by identifying similar journeys. In action 240, journeys having the same start and end location and similar start and end times are identified to obtain a group of similar journeys. The wording "same" and "similar" means that the location and end times should not necessarily by exactly the same but should be in suitable ranges. For example the same location means that the locations are within a range of 100 meter. Furthermore, a group of journeys is a group when it comprises a minimum number of similar journeys, for example 10.

After identifying similar journeys and generating the group of similar journeys in action 242, one or more pattern types are determined from the group of similar journeys. For each pattern type an entity will be generated in pattern database, wherein the entity represents a journey pattern. After action 242, the start and end location and determined pattern type can be provided and stored in the respective entities. A pattern type could be one selected from a group of repetition patterns, wherein the group of repetition patterns comprises at least two repetition patterns selected from a group comprising: every day, every working day, every day except one, every week same day, every week different days, every two weeks, every month.

Subsequently for each journey pattern one or more characteristics can be calculated by means of action 244 and linked or stored to the corresponding journey pattern. Some examples of characteristics that can be determined are: a conformity indicating the consistency of the group of journeys corresponding to the pattern type, an estimated start and end time from the start and end times of the group of similar journeys associated with the journey pattern, start and end time deviations from the start and end times of the group of journeys associated with a journey pattern. These characteristics enable to improve the quality of match with journey patterns of other users.

Optionally, in action 246 for each journey pattern a search is performed to find return journeys. Return journeys preferably have the same pattern type. The found return journeys and corresponding characteristics are linked or added to the corresponding journey pattern. In action 248, the generated journey patterns with associated calculated characteristics and optionally return journeys characteristics are stored in the pattern database 26.

Figure 7:
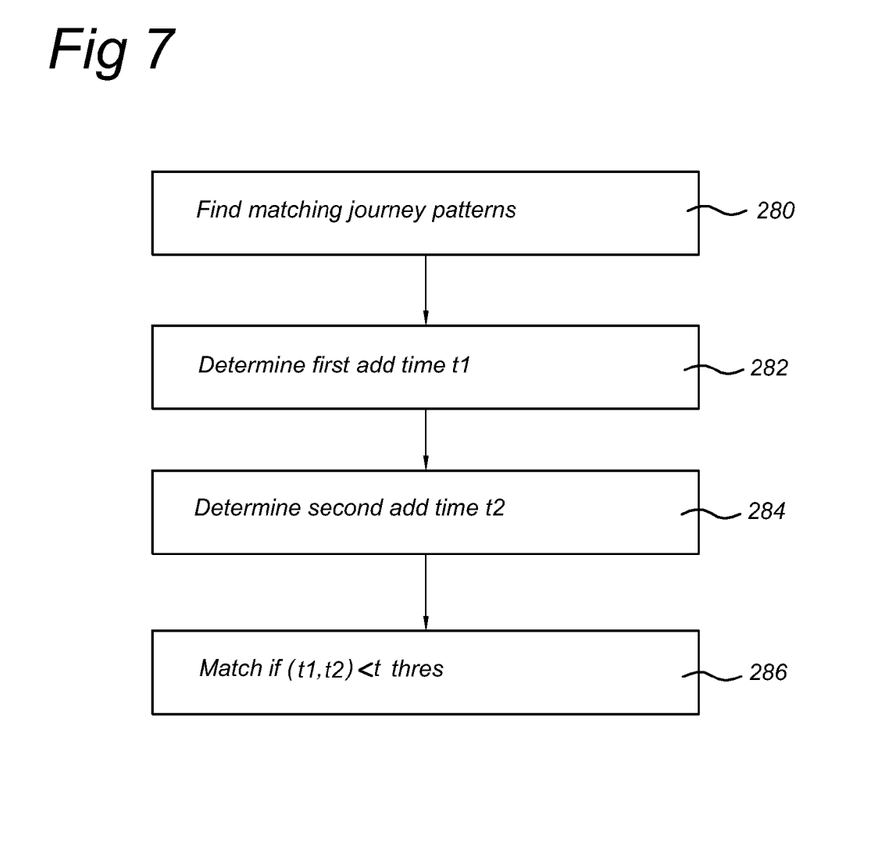

FIG. 7 schematically shows in more detail a flow diagram of some action that can be performed in action 58 in FIG. 5. A basis to find matches between journey patterns of a user and other users is formed by the user preferences. In action 280 a query is performed on the pattern database to find a pattern type of another user that matches a pattern type of the user. Pattern rules are used to determine a match between journey patterns of different users.

Action 282 determines a first additional time t1 corresponding to the traveling time between the start locations of the two journey patterns and action 284 determines a second additional time the traveling time between the end locations of the two journey patterns. In action 286 a match is detected if the first and second additional time does not exceed a predefined criterion. The predefined criteria could correspond to user preferences. Examples of predefined criteria are: $t1 < t\,thres$, $t2 < t\,thres$, $t1+t2 < t\,thres$ and any other possible combination of t1 and t2. Similarly, the conformity and other parameters of the journey patterns could be used as criteria.

In another embodiment, the start or end time of a users journey pattern and another users pattern matches if the time ranges of the two journeys have a correlation of a predefined percentage. This can be done by determining the overlapping of the time ranges defined by the start/end time and corresponding deviations. If there is a large overlap, which means high correlation, a match is considered.

The criteria enable the matching process to improve the quality of the find matches.

The invention described above has the advantage that car pooling proposals are not based on single journeys, however typical, but on patterns of journeys. Furthermore, the user does not have to specify carpool proposals, which normally correspond to a journey patters. By means of the invention, all journeys made by a user will automatically be used to create journey patterns. By means of the invention, journey patterns, i.e. carpool proposals, will be made of which the user is not aware. That patterns of journeys match between users is a better basis to start car pooling.

The descriptions above are intended to be illustrative, not limiting. Thus, it will be apparent to one skilled in the art that modifications may be made to the invention as described without departing from the scope of the claims set out below.

The invention claimed is:

1. A method of providing a car pooling assistance through a carpool system in a wireless communication system; the method comprising:
   receiving location information of a mobile communications device which is mobile with a first user both in vehicular and pedestrian journeys;
   determining non-traveling upon receipt of consecutive location information having a same location;
   storing a journey record in a journey database if a period of non-traveling exceeds a preset time;
   identifying similar journey records for the first user, the similar journey records having similar start and end locations and similar start and end times, but on different days;
   determining a match between the similar journey records of different days and a repetition pattern;
   upon determining the match between the similar journey records, storing a journey pattern record for the first user in a pattern database; and
   determining if the journey pattern record of the first user matches with a journey pattern record of another user;
   using journey pattern rules to determine whether a journey pattern type of the first user matches a journey pattern type of the another user, a match of journey pattern types being determined when one of the journey pattern types is a subset of the other journey pattern type, each journey pattern type having a different frequency, thereby enabling determining the match with users that travel less or more frequently along a same route.

2. A method according to claim 1, wherein the repetition pattern is selected from a group comprising: every day, every working day, every day except one, every week same day, every week different days, every two weeks, every month.

3. The method of claim 1, further comprising matching the journey pattern record of the first user against all journey patterns records of other users using predefined criteria comprising preferences of said first user.

4. The method of claim 3, wherein predefined criteria comprising preferences of the first user comprises one or more criteria out of a group comprising:
   maximum allowable deviation in start and end time,
   acceptable deviation in start and end location,
   same other user when matching journey pattern record and return journey pattern record with other user journey pattern records.

5. The method of claim 3, wherein matching uses journey patterns extracted from databases from various service providers.

6. The method of claim 1, further comprising sending a notification based on matched journey pattern records to the first user.

7. The method according to claim 1, further comprising:
   searching in the pattern database for a return journey pattern record that matches a journey pattern record of the first user, and,
   linking the journey pattern record and the matched return journey pattern record in the pattern database.

8. The method of claim 1, further comprising:
   finding two journey pattern records where the pattern type matches,
   determining a first additional time corresponding to a traveling time between start locations of the two journey patterns records,
   determining a second additional time corresponding to a traveling time between end locations of the two journey patterns records, detecting a match if the first additional time and the second additional time do not exceed a predefined criteria.

9. The method of claim 1, further comprising:
   receiving a choice of the first user for another user journey pattern record; and,
   setting up a communication between the first user and other user of said chosen journey pattern record.

10. A computer program product loadable into a processing unit of a service control entity, the computer program comprising non-transitory software code which, when executed by a computer, perform the method according to claim 1.

11. A service control entity for providing car pooling assistance in a wireless communication system; the service control entity comprising:
   a tracker configured to:
      receive location information of a mobile communications device which is mobile with a first user both in vehicular and pedestrian journeys;
      determine non-traveling upon receipt of consecutive location information having a same location;
      store a journey record in a journey database if a period of non-traveling exceeds a preset time;
   an extractor configured to identify similar journey records for the first user, the similar journey records having similar start and end locations and similar start and end times, but on different days;
   a matcher configured to:
      determine a match between the similar journey records of different days and a repetition pattern;
      upon determining the match between the similar journey records, to store a journey pattern record for the first user in a pattern database;
   wherein the extractor is further configured to determine if the journey pattern record of the first user matches with a journey pattern record of another user;
   wherein the extractor is further configured to use journey pattern rules to determine whether a journey pattern type of the first user matches a journey pattern type of the another user, a match of journey pattern types being determined when one of the journey pattern types is a subset of the other journey pattern type, each journey pattern type having a different frequency, thereby enabling determining the match with users that travel less or more frequently along a same route.

12. The service control entity of claim 11, wherein the matcher is configured to match the journey pattern record of the first user against all journey patterns records of other users using predefined criteria comprising preferences of said first user.

13. The service control entity of claim 12, wherein predefined criteria comprising preferences of the first user comprises one or more criteria out of a group comprising:
   maximum allowable deviation in start and end time,
   acceptable deviation in start and end location,
   same other user when matching journey pattern record and return journey pattern record with other user journey pattern records.

14. The service control entity of claim 12, further comprising a communications interface through which:
   the first user is provided with a choice for another user journey pattern record; and,
   a communication is set up between the first user and a user of said chosen journey pattern record.

15. The service control entity of claim 11, further comprising a communication interface configured to send a notification based on matched journey pattern records to the first user.

16. The service control entity of claim 11, wherein the extractor is configured to:
   search the pattern database for a return journey pattern record that matches a journey pattern record of the first user, and,
   link the journey pattern record and the matched return journey pattern record in the pattern database.

17. The service control entity of claim 11, wherein the matcher is configured to:
   find two journey pattern records where the pattern type matches,
   determine a first additional time corresponding to a traveling time between start locations of the two journey patterns records,
   determine a second additional time corresponding to a traveling time between end locations of the two journey patterns records,
   detect a match if the first additional time and the second additional time do not exceed a predefined criteria.

18. The service control entity of claim 11, wherein the extractor is configured to match journey patterns extracted from databases from various service providers.

* * * * *

UNITED STATES PATENT AND TRADEMARK OFFICE
CERTIFICATE OF CORRECTION

| | |
|---|---|
| PATENT NO. | : 8,949,272 B2 |
| APPLICATION NO. | : 12/996485 |
| DATED | : February 3, 2015 |
| INVENTOR(S) | : Hutschemaekers |

It is certified that error appears in the above-identified patent and that said Letters Patent is hereby corrected as shown below:

On the title page:

On Page 2, Item (56), under "OTHER PUBLICATIONS", in Column 2, Line 1, delete ""Carpoolnow-Just-in-Time" and insert -- "Carpool-now-Just-in-Time --, therefor.

In the drawings:

In Fig. 1, Sheet 1 of 6, delete "Fig" and insert -- Fig. --, therefor at each occurrence throughout the figures.

In the specification:

In Column 1, Line 6, delete "PCT/NL2008/050351" and insert -- PCT/NL2008/050351, --, therefor.

In Column 5, Line 11, delete "operator" and insert -- operator. --, therefor.

In Column 5, Line 13, delete "data base" and insert -- data base. --, therefor.

In Column 7, Line 40, delete "per week."." and insert -- per week". --, therefor.

In Column 8, Line 25, delete "In stead" and insert -- Instead --, therefor.

In Column 9, Line 10, delete "patter extraction application 24." and insert -- pattern extraction application 54. --, therefor.

In Column 9, Lines 47-48, delete "tracker 28" and insert -- tracker 20 --, therefor.

In Column 9, Line 50, delete "tracker 28" and insert -- tracker 20 --, therefor.

Signed and Sealed this
Twenty-third Day of February, 2016

Michelle K. Lee
*Director of the United States Patent and Trademark Office*

In the claims:

In Column 11, Line 55, in Claim 2, delete "A method" and insert -- The method --, therefor.